US008712845B2

(12) United States Patent
Christiansen et al.

(10) Patent No.: US 8,712,845 B2
(45) Date of Patent: Apr. 29, 2014

(54) ADVERTISING SYSTEM AND METHOD

(75) Inventors: Brad Christiansen, Robina (AU); Claes J M Loberg, Terranora (AU)

(73) Assignee: Guvera IP Pty Ltd, Robina (AU)

( * ) Notice: Subject to any disclaimer, the term of this patent is extended or adjusted under 35 U.S.C. 154(b) by 0 days.

(21) Appl. No.: 12/412,327

(22) Filed: Mar. 26, 2009

(65) Prior Publication Data

US 2010/0076844 A1     Mar. 25, 2010

(30) Foreign Application Priority Data

Sep. 26, 2008    (AU) ................................ 2008905028
Jan. 28, 2009    (AU) ................................ 2009200295

(51) Int. Cl.
*G06Q 30/00*      (2012.01)
*G06Q 30/02*      (2012.01)

(52) U.S. Cl.
CPC .................. *G06Q 30/0256* (2013.01)
USPC ......................................................... 705/14.54

(58) Field of Classification Search
CPC ................................................ G06Q 30/0256
USPC ................................................... 705/14.54
See application file for complete search history.

(56) References Cited

U.S. PATENT DOCUMENTS

| | | | |
|---|---|---|---|
| 5,710,884 A * | 1/1998 | Dedrick ........................ 709/217 |
| 5,724,521 A | 3/1998 | Dedrick | |
| 6,009,410 A * | 12/1999 | LeMole et al. ............. 705/14.54 |
| 6,760,916 B2 * | 7/2004 | Holtz et al. ...................... 725/34 |
| 2005/0222905 A1 | 10/2005 | Wills | |
| 2008/0147505 A1 | 6/2008 | Davis | |
| 2008/0154716 A1 | 6/2008 | Meazoa | |

FOREIGN PATENT DOCUMENTS

| | | |
|---|---|---|
| WO | WO00/29969 A1 | 5/2000 |
| WO | WO2006/100923 A1 | 9/2006 |

* cited by examiner

*Primary Examiner* — James W Myhre
(74) *Attorney, Agent, or Firm* — Manatt, Phelps & Phillips, LLP

(57) ABSTRACT

An advertising system including at least one consumer database containing a plurality of consumer profiles with consumer preference identifying data, at least one brand database containing details of brand clients, each having one or more branding parameters, at least one content database containing a plurality of pieces of content provided by at least one content provider with each piece of content having one or more content profile identifiers, and a content matching engine which matches the branding parameters of the brand clients with one or more of pieces of content and provides these pieces of content to one or more consumers upon the consumer request, based on the matching of the branding parameters and the consumer preference identifying data at no cost to the consumer whilst charging an advertising fee to the brand client and paying a content provision fee to the content provider.

21 Claims, 9 Drawing Sheets

ADVERTISING SYSTEM AND METHOD

RELATED APPLICATIONS

This present application claims priority from Australian Patent Application No. 2009200295 filed Jan. 28, 2009, which claims priority from Australian Patent Application No. 2008905028 filed Sep. 26, 2008, both of which are incorporated herein by reference in their entirety for all purposes.

FIELD

The present invention relates to advertising systems and methods and in particular embodiments of the present invention provide advertising systems allowing the provision of matched content to consumers.

BACKGROUND

The advent of information networks such as the Internet have changed the manner in which the world and its citizens interact with one another.

As an example, the Australian music industry has experienced a decline in average song value from 85 c in 2005 to 71 c in 2007.

The ease in which the media can be electronically copied and shared has changed the face of the entertainment industry world-wide. The issue is one of the most controversial to arise from the growth of the Internet. As intellectual property and copyright owners lose increasing amounts of royalties each year, from both declining sales and increasing online piracy, they are demanding better protection from law makers, courts and third parties to assist them in curtailing the practice of unchecked digital content sharing.

As rapidly as the industry has identified "solutions" such as digital rights management (DRM) and encryption, innovative software developers find counter solutions. Through loopholes in the laws, the illegal download market for music alone has grown to approximately 6 billion downloads per annum. When the sum of music, television, film and books, the amount of illegal downloading is growing in popularity and no end is in sight.

At the same time, the advertising market is experiencing significant growth. Whilst US advertising is expected to grow more slowly than the rest of the world, due mainly to its maturity, global spending on advertising is expected to increase to US$653.5 billion aided by above average growth in emerging markets such as China, India and Russia.

However, despite the extra funds, advertisers are demanding greater performance for each advertising dollar. Marketers are now insisting on an immediate return on investment (ROI) on their advertising investments prior to approving the spending. Further, whilst advertising budgets for traditional media such as television and radio have not increased by as much as the consumer price index (CPI), strong increases on Internet spending is forecast to continue.

The evolving manner in which consumers are accessing media poses an increasing challenge for the advertising industry as it competes for consumer's attention and time. Advertisers raise spending to put more ads in more places, but that onslaught is turning all marketing messages into mere noise. More and more companies are searching for different ways to spend their marketing dollars by seeking to align where they present their advertising message to media relevant to their market.

The 2006 report from the International Federation on the Phonographic Industry (IFPI) found that 20 billion songs were swapped or downloaded in 2005. In 2008 IFPI reported that illegal downloads are now 20 times the number of tracks sold. The proportions of physical, digital and stolen music in the Australian music industry is illustrated in FIG. 1. FIG. 2 is a graphical illustration of the value present in the Australian music industry and the proportions of CD sales (physical), digital sales (digital), lost sales (stolen) and importantly, the value of illegal downloads.

The system of the embodiments of the present invention brings the consumer to the marketer, giving the consumer the free content that they want whilst paying the copyright owner for each and every piece of content that it gives away.

It will be clearly understood that, if a prior art publication is referred to herein, this reference does not constitute an admission that the publication forms part of the common general knowledge in the art in Australia or in any other country.

SUMMARY

The embodiments of the present invention are directed to advertising systems and methods, which may at least partially overcome at least one of the abovementioned disadvantages or provide the consumer with a useful or commercial choice.

With the foregoing in view, embodiments of the present invention in another form, resides broadly in an advertising system including 1. at least one consumer database containing a plurality of consumer profiles with consumer preference identifying data,
2. at least one brand database containing details of brand clients, each having one or more branding parameters,
3. at least one content database containing a plurality of pieces of content provided by at least one content provider with each piece of content having one or more content profile identifiers, and
4. a content matching engine which matches the branding parameters of the brand clients with one or more of pieces of content and provides these pieces of content to one or more consumers upon the consumer request, based on the matching of the branding parameters and the consumer preference identifying data at no cost to the consumer whilst charging an advertising fee to the brand client and paying a content provision fee to the content provider.

In an alternative form, embodiments of the invention resides in a method of providing brand matched content to a consumer, the method including the steps of:

i. creating and maintaining at least one consumer database containing a plurality of customer profiles with consumer preference identifying data;
ii. creating and maintaining at least one brand database containing details of brand clients, each brand client having one or more associated branding parameters;
iii. creating and maintaining at least one content database containing a plurality of pieces of content provided by at least one content provider, with each piece of content having one or more content profile identifiers; and
iv. matching at least some of the branding parameters of the brand clients with one or more of pieces of content; and
v. providing these pieces of content to one or more consumers upon consumer request, based on the matching of at least some of the branding parameters and the consumer preference identifying data, at no cost to the consumer whilst charging an advertising fee to the brand client and paying a content provision fee to the content provider.

The system of an embodiment of the present invention is a transactional model allowing entertainment content to be bought and sold over a digital interface, examples of which include web interfaces, mobile networks and digital television. The transactional model is linked to the system database which tracks the content transacted, enables payment to content owners and importantly, enables consumer brands to build campaigns that target consumers. The system can be used to buy and sell physical media upon which entertainment content is stored as well as electronic content or content available in electronic form.

Entertainment content will typically be free to consumers to download as advertisers will pay a per download fee to the entertainment owners for each file that their target consumers download. The reason advertisers will pay for each file download is because they will have the opportunity to build a unique relationship with their targeted consumers.

The content matching engine will preferably match the content with one or more brands based on the personality of each and then provide the brand matched content to the consumer at no cost to the consumer in order that the brand can build an association with the consumer through the content. Typically, the content when provided to the consumer will identify or be identified as being provided to the consumer free of charge on behalf of the matching brand client or brand in order to build affinity with the brand in the mind of the consumer.

In one embodiment, the system of the present invention is an advertising system. The system of the present invention will preferably be computer implemented. As such, the system will normally be implemented on at least one computer including one or more processors, storage means and associated with one or more communications pathways.

The system of an embodiment of the present invention may be implemented using devices with computer processors such as telephones, portable or desktop computers, personal data storage devices, MP3 and MP4 players, audiovisual storage and display devices, televisions and the like. Provided that a device that can access communications pathways for the downloading of content, that device may be used according to the system of the present invention.

Typically, the content matching engine of an embodiment of the present invention will be located on a network of computers such as the Internet. Indeed, the system of an embodiment of the present invention will normally be accessed through a network of computers such as the Internet or a worldwide network.

Typically, the advertising system of an embodiment of the present invention will be accessed through an interface provided as a webpage located on a world wide network of computers. In this way, the system of an embodiment of the present invention can provide targeted advertising at a personal level to a large number of users simultaneously.

The system of an embodiment of the present invention is adapted to provide tailored advertising through the provision of content which is preferred by consumers being linked with advertising from brands being associated with that content.

In a preferred embodiment, the system will be implemented across any network and will typically be network independent, with no network prevented from access to the system but no network preferred either.

The system of an embodiment will normally have a system administrator. The system administrator will typically have access to all parts of the system and may have access through the same interface as the other members of the system was through a stand alone, or separate specialized interface. Normally, the system administrator will have accessed through the same interface with the level of access of the system administrator differentiated by access on login information which will distinguish the system administrator from other users or members.

An embodiment of the system of the present invention will therefore have members of at least the following general classes, as well as the system administrator:

1. consumers;
2. brand clients;
3. content providers.

The system has at least one consumer database containing a plurality of customer profiles with preference data. The at least one consumer database will typically be created and maintained by a system administrator, with the data in the database(s) updated and maintained mainly by the consumers themselves, once the consumers are members of the system.

Membership to the system for consumers will typically be free in response to the consumer providing information or creating a consumer profile. Typically, this will (once checked by the system administrator, typically by an automated system of the system administrator) allow the consumer access to the system. There may be different levels of consumer membership based on the amount of information provided by a consumer with a consumer who provides more, or more detailed information being provided with more privileges than a consumer that provides less information.

Each consumer will typically have a consumer profile containing information of two basic types namely, generic identifying information such as name, address, contact details and also habit or preference data such as age, likes and dislikes, music choices, brand preferences and the like.

Typically, the preference data may be captured or provided by a consumer directly, that is, in answer to direct questions as to their preferences. Alternatively, the preference data may be captured or provided through surveys, testing or quizzes, for example in order to build a consumer preference profile for each consumer.

The consumer profile will typically therefore have a set of information which is more or less fixed, namely the generic identifying information (although it is anticipated that this set of information will change such as for example, if a consumer moves or changes addresses) and a set of variable information namely that their consumer preference information as the set of information is likely to change over time.

As mentioned above, membership to the system for the consumers will typically be through the system administrator although this process may be automated and systems provided to approve membership of consumers based on the information provided. There may additionally be an automated system which marks a consumer profile as "inactive" if the profile has not been updated or used for a particular period of time. This will preferably increase the motivation of consumers to maintain an active profile and also assist with ensuring that the consumer's preference profile is up to date.

Also as mentioned above, consumer membership is voluntary and consumers may join at any time. Consumers may have a single profile or multiple profiles. Consumer membership applications may be subject to screening by the system administrator. The most important part of the consumer membership is the provision of preference data and this may be a precondition for consumer membership.

The consumers may have access to their consumer profile through a consumer interface and access to the at least one consumer database will typically be according to login or access information which will give a consumer access to their own profile. Normally, the consumers will access the generic interface and access will be granted based on their login or identifying information with use of the system limited according to that information.

Consumers may typically amend their consumer data at any time which will normally upload to the at least one consumer database. Each consumer will typically be identified by their preference data with the only access to the consumer profiles by a third party being through the system administrator.

The system has at least one brand database containing details of brand clients, each having one or more branding parameters. The brand clients may be members of the system through a third-party media or advertising agency or directly.

Membership to the system by the brand clients will normally occur along a similar basis to the consumer members but the brand clients will typically be provided with different abilities. Normally, the abilities or rights of the brand clients within the system will be determined by the brand client login or identifying information used, once the brand client becomes a member of the system.

Typically, brand clients will join the system in order to advertise by building a relationship with the consumer through an association with particular content which will also typically convey to the consumer, a particular positioning strategy of the brand client.

The brand clients may not be direct (that is active uploading) members of the system but may be pseudo-members of the system. For example, a brand client may have signed a representation agreement with a media or creative agency which will advise on a particular brand strategy. The brand client will still be a member of the system to the extent that the at least one brand database will contain information and identifying particulars of the brand client, but the interaction with the system on behalf of the brand client may be undertaken by the media or creative agency representing the brand client. In this case, the brand client will typically be a member of the system as the paying customer even though the media/creative agency may design and implement the marketing or branding strategy by managing the branding parameters within the system.

The brand clients (or a representative) will typically define their own brand personality and/or particular positioning strategy using the branding parameters. The personality or positioning strategy may be in relation to the brand as a whole or particular products or lines within a house brand.

The brand clients (or a representative) will also typically define their target demographic or geographic area.

The at least one brand database will preferably contain identifiers of the brand client for example company name and contact information and also the branding parameters which will preferably define the message which the brand wishes to convey to their targeted demographic. These branding parameters may be positively recited, such as "prefers name brand" or negatively recited, such as "non-smoking".

The system of an embodiment has at least one content database containing pieces of content with each piece of content having one or more content profile identifiers.

The pieces of content (which may be simply referred to as "content") may have any form including music, audio, video, books, still images, snippets, or portions of the above. Basically, the content can have any form provided that the content is electronic or digital in order that the content can be transmissible between the system and the at least one consumer and between the at least one content provider and the system. Normally, each piece of content will be stored in an electronic file and it is this electronic file which will typically be capable of transmission, dissemination or copying or the like onto a physical medium.

The content will typically be provided from any source. For example, an entertainment studio, TV network, Internet social networking systems or record labels may choose to provide content to the system. Alternatively, smaller organizations or individuals may choose to provide content directly to the system such as home movies, demo music tracks or the like.

The content may be provided directly to the system or indirectly. Normally, the content provider will have to be or have a legal relationship with the content owner and systems will normally be provided to monitor the content in this regard to minimize the risk that content can be provided without the permission of the owner.

Each piece of content will also have one or more content profile identifiers which will typically be referred to as "tags". Each piece of content will also typically have identification or ownership information. Preferably, the ownership information identifies who owns the content in order to recompense the owner and the tags will identify the type of content.

Each piece of content will typically be tagged according to its "type". Each piece of content will preferably be tagged according to its Genre, Mood, Style and Theme. For example, the Genre tags will normally be those used in a particular industry such as music genre including pop, classical, rock, rhythm and blues, house/techno, folk and the like. Each of these broad genre categories may include at one or more sub-genre. There are also typically genre associated with video games, television, film, literature and the like. Therefore, each piece of content will typically be tagged according to its broad type and then further tagged according to genre. Normally, the genre tagging will also fit with the accepted genres in industry.

Mood tagging will preferably represent the relatively long-lasting, effective or emotional state that the content offers for example fun, cheerful, humorous, gentle, scary, thought provoking, reflective and the like.

Style tagging will preferably identify the pieces of content for composition or format. Genres have been used to identify "style", but the system of the present invention will typically tag the content with more complexity. For example, a song may be a rock genre song but maybe further classified using style tagging as modern rock or contemporary rock and may indicate the basic style of the entertainment content.

Theme tagging will typically identify the broad idea, message or lesson conveyed in the piece of content. For example the piece of content may be comforting, relaxing, suggestive or the like.

Importantly, tagging systems have been used conventionally but the tagging systems vary depending upon the provider of the content and the various entertainment types. The system of the present invention will typically provide a standard for content tagging.

Content tagging may also be adjusted or performed through the monitoring of Internet searches or the like for example, through reviews, comments, links and categorisation. The present system therefore accounts for the fact that consumers will typically search the Internet for particular content and may use these searches and/or results to improve the accuracy of the content tagging. In this manner, the content tagging may be reactive. Typically, any content tagging will occur in real time as will adjustments to content tagging, as the popularity of particular content and/or preferences of a consumer will typically vary over time.

The content tag updates may be periodic or preferably ongoing in real time.

Preferably, each piece of content will be initially tagged upon uploading or the first provision of that piece of content to the system. There will typically be an analysis process upon uploading in order to check to see whether a particular piece of content which has been submitted is not already present on the system.

The tags for the piece of content may be changed or vary over time in response to feedback from consumers who have been provided with that piece of content. There may therefore be a feedback mechanism in place to question or follow-up with consumers who have been provided with a piece of content to request whether the piece of content was tagged in the correct way and/or that the tag is up-to-date. The tag updating process may be an automated process.

Each piece of content may have more than one tag but preferably, the number of tags will typically be limited to no more than between 5 to 10 tags. Tags may also be provided in different levels of importance with the number of tags in each level varying with the level of importance. For example, there may only be 5-10 top-level importance tags attached to a piece of content but that same piece of content may have 10-1000 less relevant or important tags.

The system has a content matching engine which matches the branding parameters of the brand clients with one or more of pieces of content and provides these pieces of content to one or more consumers upon the consumer request, based on the matching of the branding parameters and the consumer preference data at no cost to the consumer whilst charging an advertising fee to the brand client and paying a content provision fee to the content provider.

The content matching engine will typically provide an automated means of providing a consumer with free content whilst providing the brand clients with the ability to associate themselves with content that conveys their particular brand personality and identity to consumers, thereby building an association with the consumer or in the consumer's mind.

The content matching engine provides the ability of brand clients to target and reach consumers in this way whilst recognizing and recompensing the content owner.

There are preferably three main portions to the system each of which will interact with the content matching engine to provide the above functionality.

The first main portion will preferably be the Content Interface. Through this interface, the content provider will typically be able to upload content which they wish to distribute through the system into the at least one content database. Access to the system as a content provider will be through login or other identifying information which will typically require the content provider to join the system as a content provider member.

Typically, the content provider will set up an account with key contact details, bank account details for remuneration payments, online agreements and the like. Typically a content provider will also provide salient information as to the type of entertainment (recorded music, filmed entertainment, gaming entertainment or the like), the identity of distributors, contact details, licensing arrangements, and hosting details for example.

The content provider can then upload their new content to the at least one content database. Once the content has been uploaded, the content will then typically be tagged either by the system administrator or via a tagging system discussed above.

The second main portion of the system will preferably be a Brand or Campaign Interface. The Brand/Campaign Interface is preferably used by media agencies, creative agencies or by brand clients themselves. Smaller brand clients will not have creative agencies and media agencies and the functionality will be used by the brand clients themselves. The Brand/Campaign Interface has two main functions, namely:

1. To define a campaign that targets consumers according to their geographic/demographic data and their brand preferences. The brand client may preferably be able to define the consumers which will be eligible to access content which will be paid for by the brand client; and
2. To define the personality of a brand and associations with branded entertainment. For example, Coke™ could choose the personality of fun and excitement to associate with their brand. The content matching engine within associates their desired brand personality with content and consumer groups (based on geographic and demographic factors) by correlating the genre/mood/style and theme tagging on the content and providing this content to the consumer falling within the geographic and demographic factors designated by the brand client at no cost to the consumer but with branding associated with the content to allow the brand to be identified with the content by the consumer.

The process for use of the Brand or Campaign Interface by the brand client is typically as follows:

1. Create Brand file. Name, global Brand Rules, agencies associated with, and target countries.
2. Create Compilation file. Each brand client typically defines one or many compilations that targets one or more aspects of the personality which the brand client wishes to portray. The brand client can then preferably selecting content types (e.g. music, film), Genre, Style and Tone of brand, country, region (postcode based), sex, and also restrictions, before example, no smoking, violence, sex or alcohol related content, for example.
3. Create Campaign file. The Campaign file typically defines the compilation to be used, the value associated with the campaign in terms of the maximum value of content which can be downloaded during the campaign, the region or postcode for this campaign, consumer age range target, number or value of songs or other content to be associated with this campaign, maximum price per content, max spend per consumer as examples.
4. Select Distribution Channel. The brand client can also select the preferred distribution channel or channels for example web channel through brand site, mobile telephone or other display apparatus, TIVO or the like.

For particular brand clients normally the smaller brand clients, the system administrator may design algorithms to provide an optimized and simplified campaign model. For example, a campaign spend of $500 to obtain 500 people in a postcode/region in a defined sex/age group and a simplified brand personality based on genre and mood. Where these campaign models are provided, the brand clients may be provided with a list from which they can select an appropriate preloaded campaign model or the brand client may design a custom campaign model.

The third main portion of the system will typically be a Consumer Interface. The Consumer Interface will typically provide a mechanism by which consumers can become a registered user of the system as discussed above. The Consumer Interface will also preferably provide a mechanism by which a registered consumer can search for content. Normally searching facilities are provided which may allow simple or advanced searches. Typically the searches may be performed in the light of a particular registered consumers user profile and may only return results that match in both the users search parameters and their consumer profile data.

Normally, the searching facility will provide a matching or best fit result. Preferably, the results will be in the form of a short list which returns the matches to the search and identifies the matches by associating a brand with each match. For example, a search for a particular content piece may return five results for the content piece with each of the results associated with a different brand allowing the consumer to choose the content according to the associated brand.

Embodiments of the system may additionally allow a brand client to enable their own webpage to offer branded entertainment content. The brand client can offer content to registered system consumers only and request login or identification information in order to identify the consumer as a registered system consumer. If the consumer is not a registered system consumer, the prospective consumer will be redirected to the Consumer Interface in order to become a registered user.

Alternatively, the system may allow generic searching that is searching not based on a particular registered users' profile. This will typically return results on any branded content.

The content matching engine will typically provide a transactional model allowing content to be downloaded by a consumer provided that the content matches the consumer's search preferences, and that the consumer fits within the brand client's preference parameters. The content matching engine will therefore check the consumer profile prior to releasing the content for download and compare the consumer profile with the branding parameters entered by the brand client. The content matching engine also tracks the content downloaded, and enables payment to content owners once download has been authorized.

There will therefore be a request by consumer in the form of a search, authorization of the download of the content provided that the consumer's profile matches the branding parameters of the brand client, and once the download is complete (or upon authorization of the download) the content matching engine will also authorize the payment of remuneration to the content owner, through a third party if required.

Authentication of identity systems may be used in conjunction with the system of embodiments of the present invention. There are many of these systems available and any may be used to authenticate the identity of members of any of the groups associated with the system. The authentication system will typically be integrated with the transaction system and the consumer request, uploading of content and provision of content sub-systems.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of currently preferred embodiments, reference is made to the following Detailed Description, which is to be read in association with the accompanying drawings, wherein.

DETAILED DESCRIPTION OF THE PREFERRED EMBODIMENT.

Currently preferred embodiments of the advertising systems and methods are described more fully hereinafter with reference to the accompanying drawings, which form a part hereof, and which show, by way of illustration, exemplary embodiments. The invention may, however, be embodied in many different forms and should not be construed as limited to the embodiments set forth herein. Rather, the disclosed embodiments are provided so that this disclosure will be thorough and complete, and will fully convey the scope of the invention to those skilled in the art. Among other things, the present invention may be embodied as methods or devices or combinations thereof. Accordingly, the present invention may take the form of an entirely hardware embodiment, an entirely software embodiment or an embodiment combining software and hardware aspects. The following detailed description is, therefore, not to be taken in a limiting sense.

As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

According to a particularly preferred embodiment illustrated, and advertising system and method of use therefor, is provided.

Figure 1:
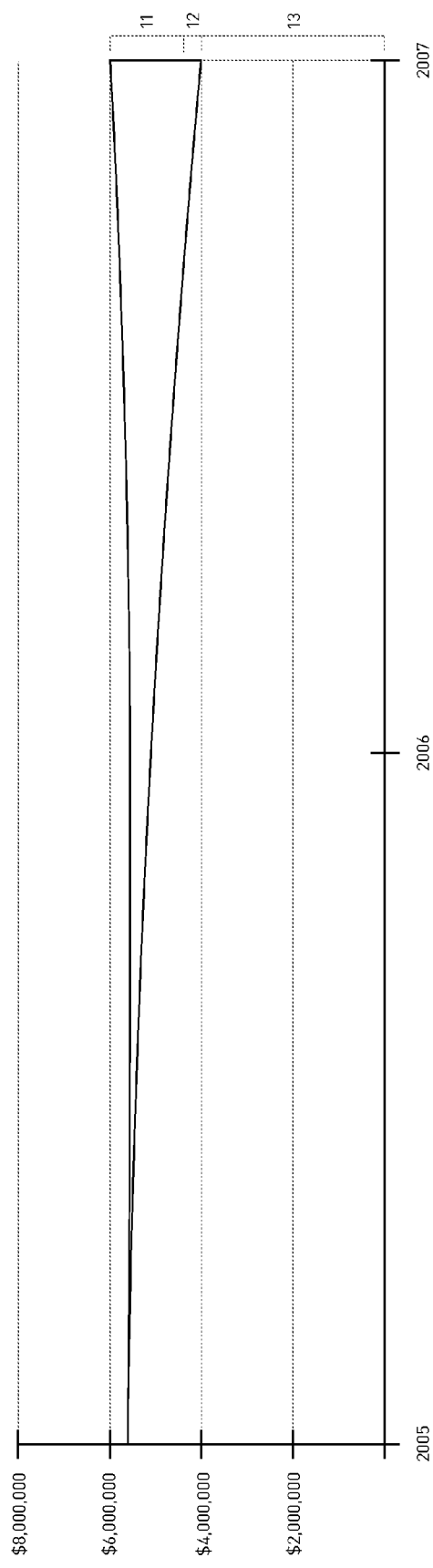
FIG. 1 is a graphical illustration of the proportions of physical, digital and stolen music in the Australian music industry.
Figure 2:
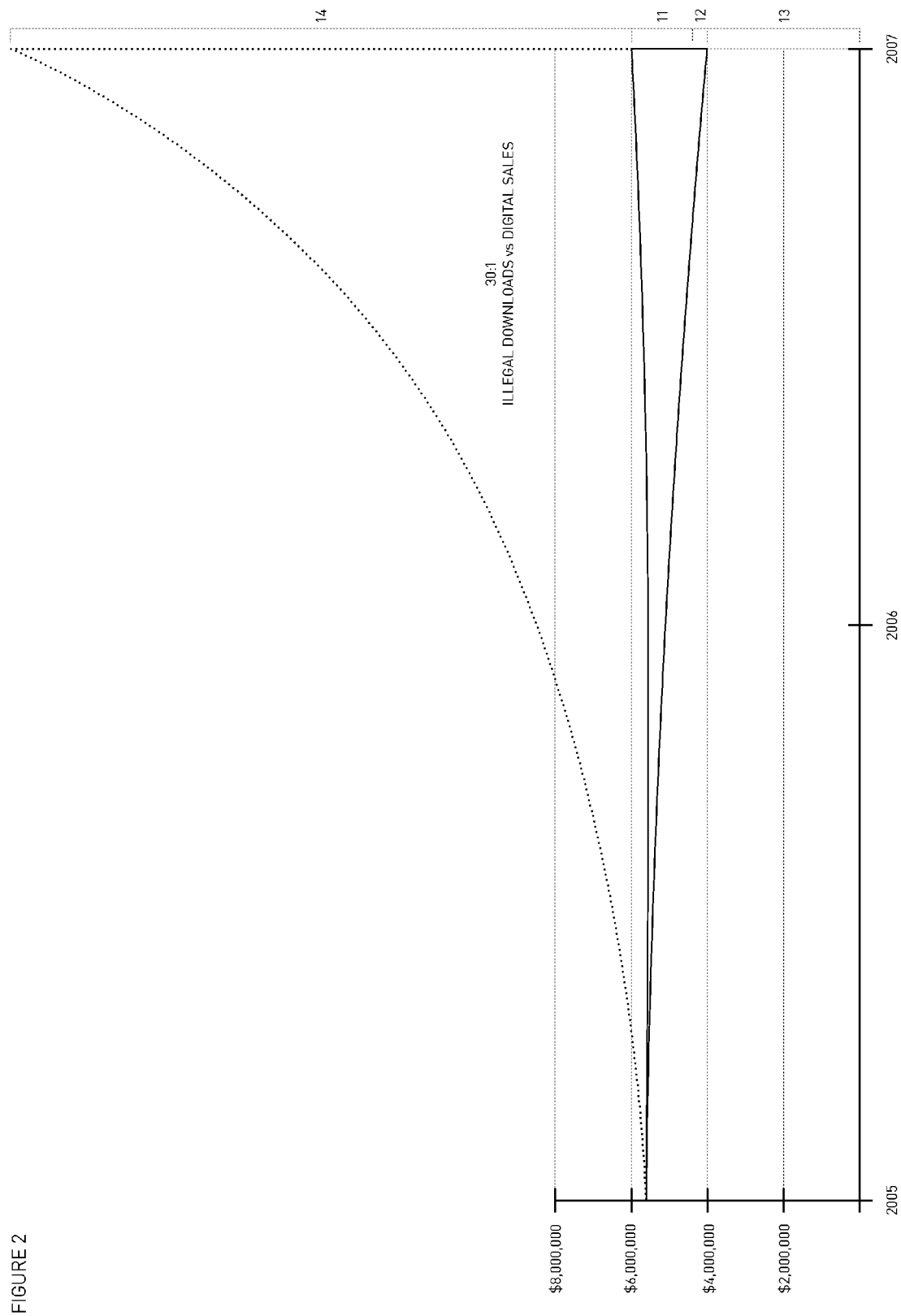
FIG. 2 is a graphical illustration of the value present in the Australian music industry and the proportions of CD sales (physical), digital sales (digital), lost sales (stolen) and illegal downloads.
Figure 3:
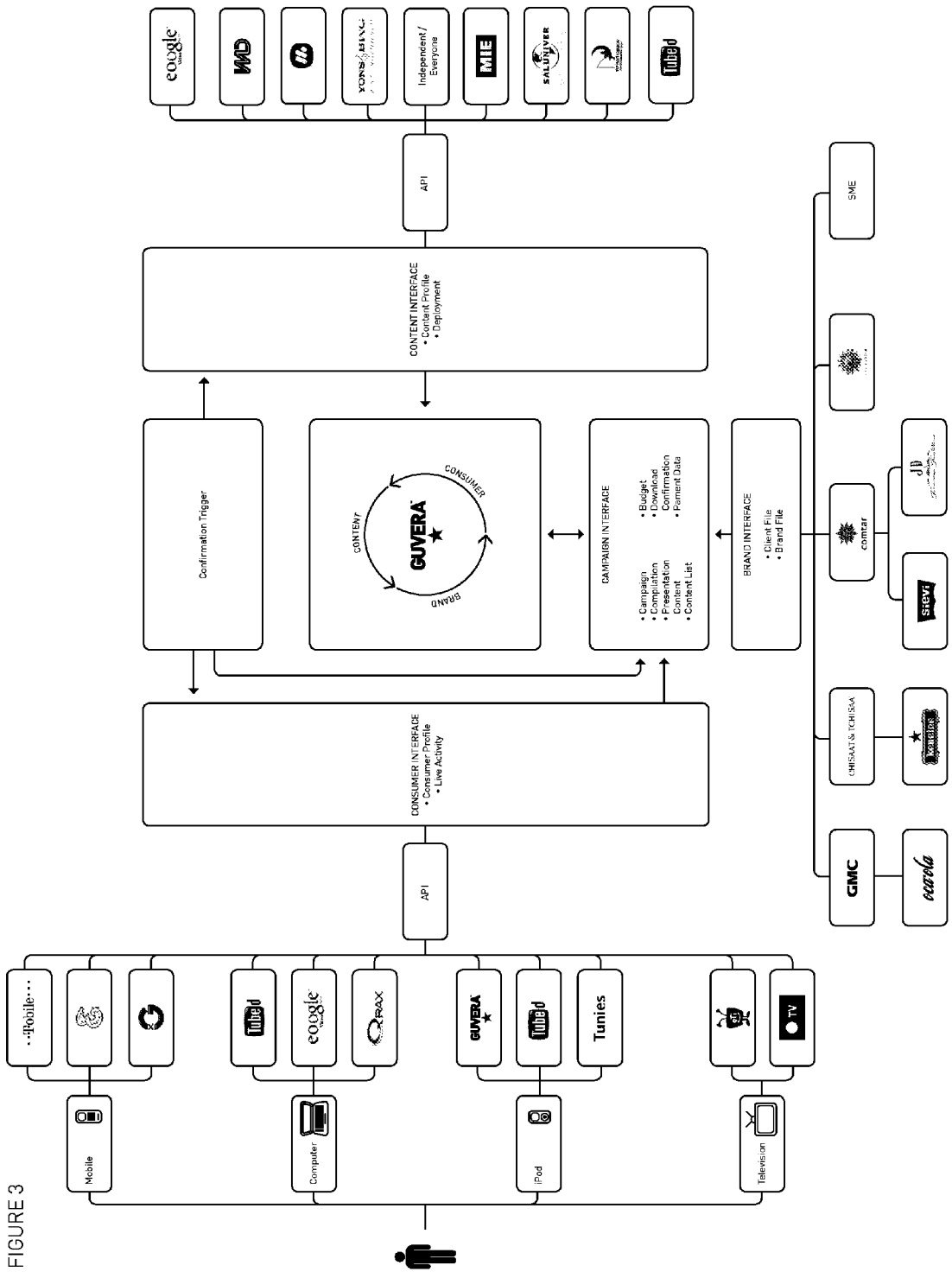
FIG. 3 is a schematic illustration of advertising system architecture according to a preferred embodiment of the present invention.
Figure 4:
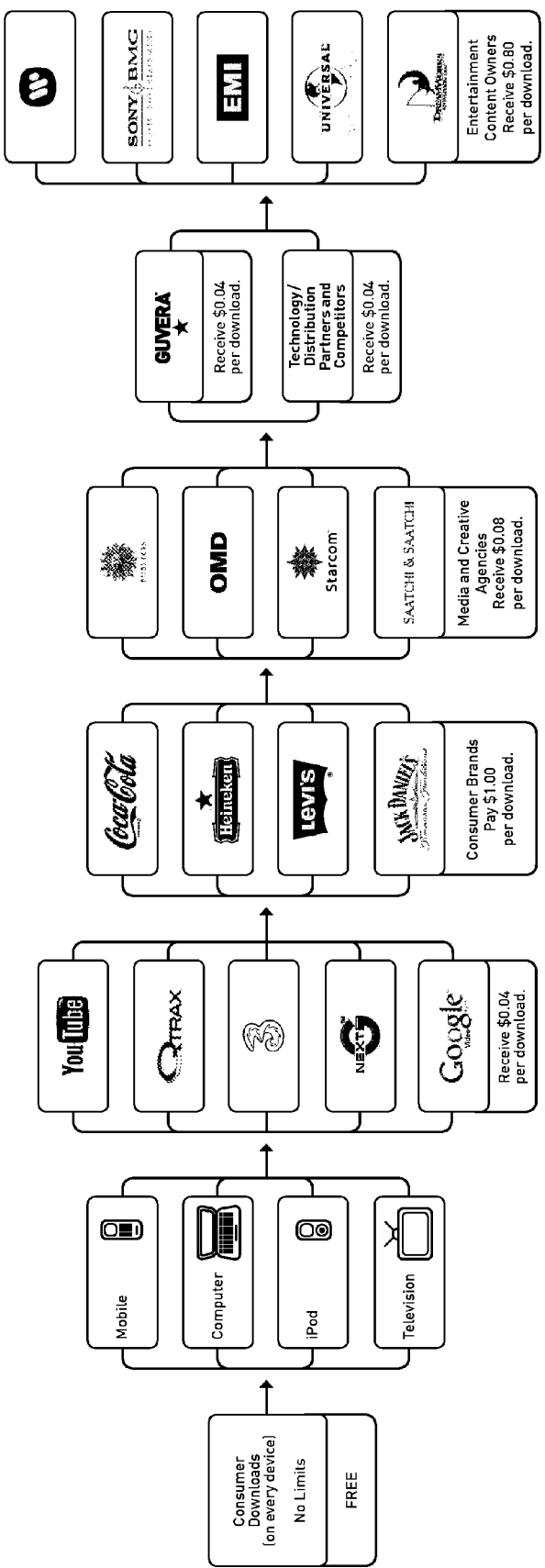
FIG. 4 is a schematic illustration of the working of the preferred embodiment of advertising system illustrated in FIG. 3.

The general schematic of components of the system of the preferred embodiment is illustrated in FIG. 1.

The central content matching engine is illustrated between a consumer interface, a brand interface, and a content interface.

Figure 5:
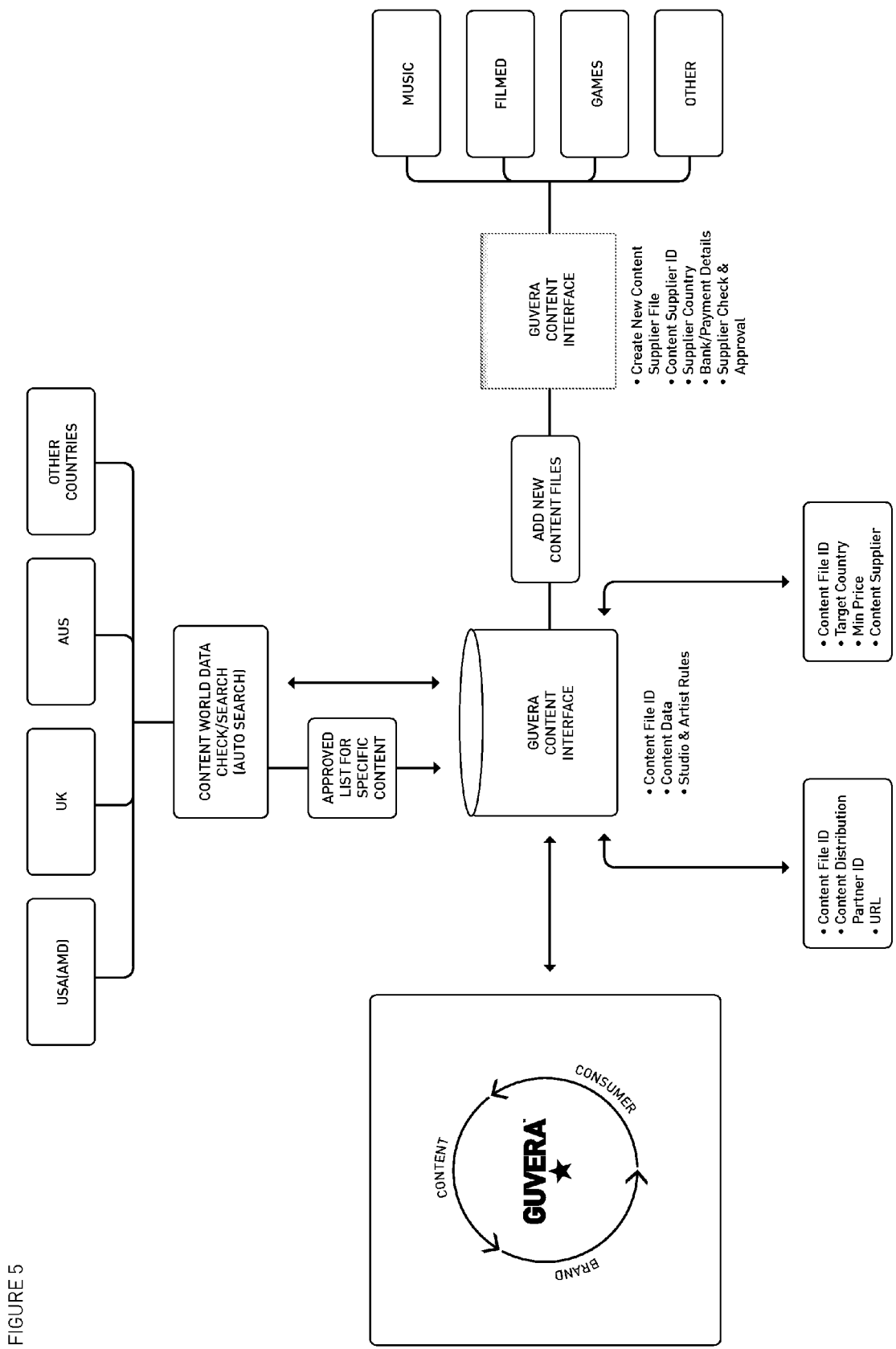
FIG. 5 is a schematic illustration of a content interface according to a preferred embodiment of the present invention.

Through the content interface, a preferred form of which is illustrated in FIG. 5, the content provider uploads content which they wish to distribute through the system into the content database. Access to the system as a content provider is through login or other identifying information which will require the content provider to join the system as a content provider member.

The content provider will set up an account with key contact details, bank account details for remuneration payments, online agreements and the like. The content provider will also provide salient information as to the type of entertainment (recorded music, filmed entertainment, gaming entertainment or the like), the identity of distributors, contact details, licensing arrangements, and hosting details for example.

The content provider can then upload its new content to the content database. Once the content has been uploaded, the content is tagged with one or more content profile identifiers. Each piece of content has identification or ownership information to identify who owns the content in order to recompense the owner.

Each piece of content will typically be tagged according to its genre, mood, style and theme. For example, the genre tags will normally be those used in a particular industry such as music genre including pop, classical, rock, rhythm and blues, house/techno, folk and the like.

Mood tagging represents the relatively long-lasting, affective or emotional state that the content offers for example fun, cheerful, humorous, gentle, scary, thought provoking, reflective and the like.

Style tagging identifies the pieces of content for composition or format. Genres have been used to identify "style", but the system of the preferred embodiment tags the content with more complexity. For example, a song may be a rock genre song but further classified using style tagging as modern rock or contemporary rock.

Theme tagging identifies the broad idea, message conveyed in the piece of content. For example, the piece of content may be comforting, relaxing, suggestive or the like.

Content tagging will also be adjusted through the monitoring of Internet searches or the like for example, through reviews, comments, links and categorization. Any content tagging will occur in real time, as will adjustments to content tagging, as the popularity of particular content and/or preferences of a consumer will typically vary over time.

Each piece of content is initially tagged upon uploading of that piece of content to the system. They is also an analysis process upon uploading in order to check to see whether a particular piece of content which has been submitted is not already present on the system.

Figure 6:
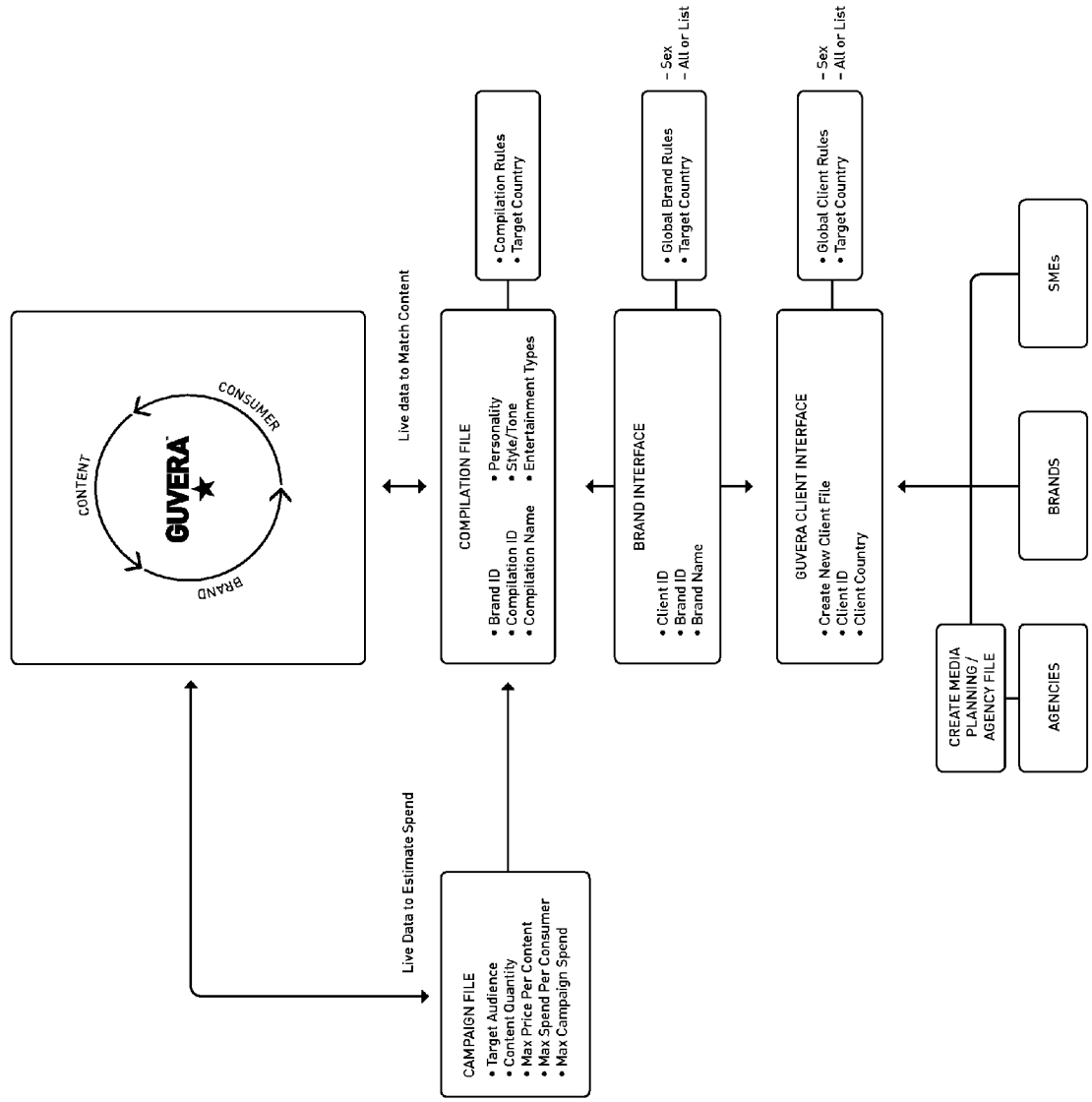
FIG. 6 is a schematic illustration of a campaign interface according to a preferred embodiment of the present invention.

The Brand Interface, a preferred form of which is illustrated in FIG. 6, is used by media agencies, creative agencies or by brand clients themselves. Smaller brand clients will not have creative agencies and media agencies and the functionality will be used by the brand clients themselves. The Brand Interface has two main functions, namely:

1. To define a campaign that targets consumers according to their geographic/demographic data and their brand preferences. The brand client defines the consumers which will be eligible to access content which will be paid for by the brand client; and
2. To define the personality of a brand and associations with branded entertainment. For example, Coke™ could choose the personality of fun and excitement to associate with their brand. The content matching engine within associates their desired brand personality with content and consumer groups (based on geographic and demographic factors) by correlating the genre/mood/style and theme tagging on the content and providing this content to the consumer falling within the geographic and demographic factors designated by the brand client at no cost to the consumer but with branding associated with the content to allow the brand to be identified with the content by the consumer.

In one embodiment, the process for use of the Brand and Campaign Interface by the brand client is typically as follows:

1. Create Brand file. Name, global Brand Rules, agencies associated with, and target countries normally through the Brand Interface.
2. Create Compilation file. Each brand client can also define one or many compilations that targets one or more aspects of the personality which the brand client wishes to portray. The brand client can then preferably selecting content types (e.g. music, film), genre, style and tone of brand, country, region (postcode based), sex, and also restrictions, before example, no smoking, violence, sex or alcohol related content, for example.
3. Create Campaign file. The Campaign file typically defines the compilation to be used, the value associated with the campaign in terms of the maximum value of content which can be downloaded during the campaign, the region or postcode for this campaign, consumer age range target, number or value of songs or other content to be associated with this campaign, maximum price per content, max spend per consumer as examples.
4. Select Distribution Channel. The brand client can also select will be preferred distribution channel or channels for example web channel through brand site, mobile telephone or other display apparatus, TIVO or the like.

Figure 7:
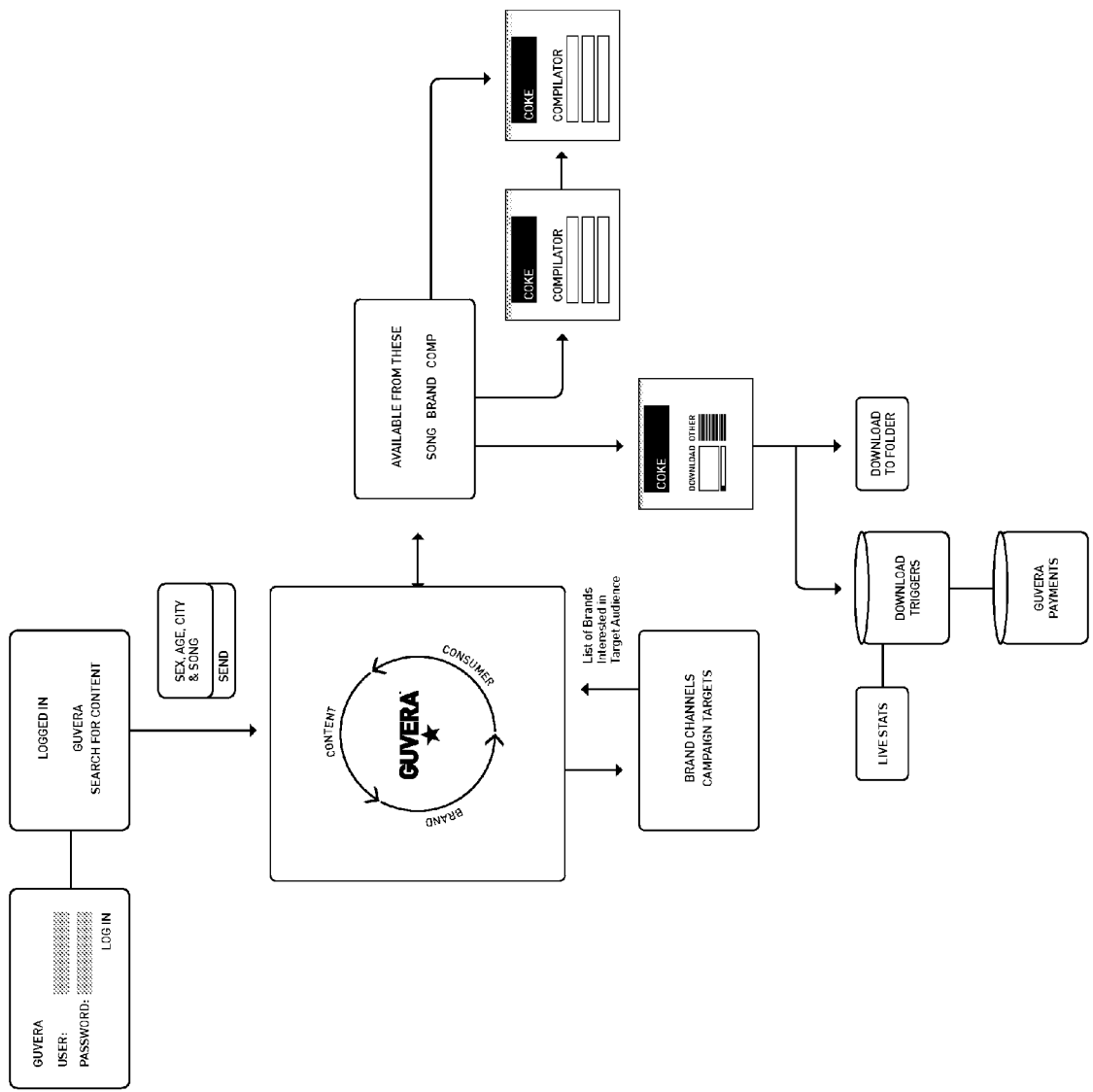
FIG. 7 is a schematic illustration of a consumer interface according to a preferred embodiment of the present invention.
Figure 8:
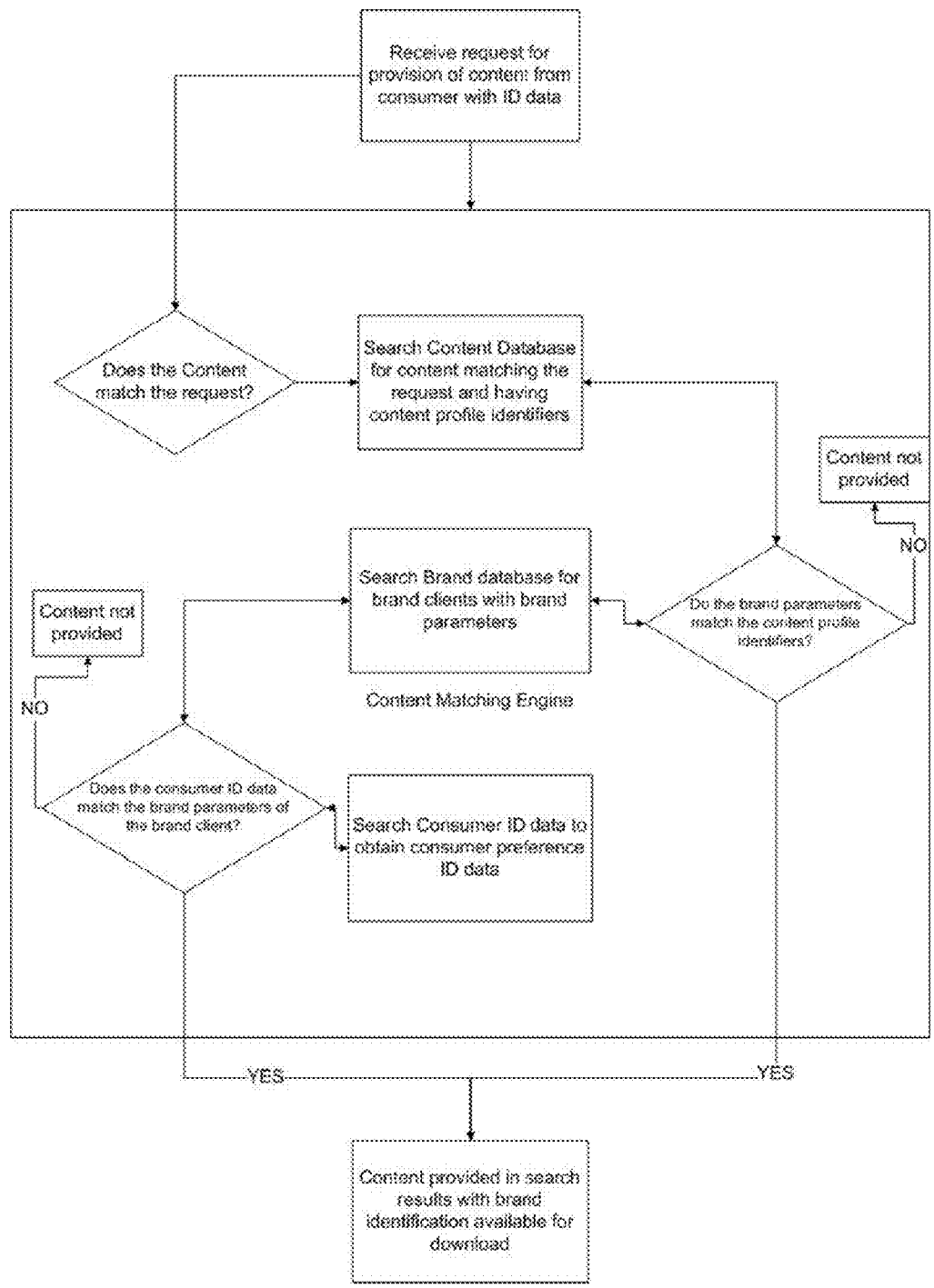
FIG. 8 is a flowchart of the algorithm of the content matching engine according to a preferred embodiment of the present invention.
Figure 9:
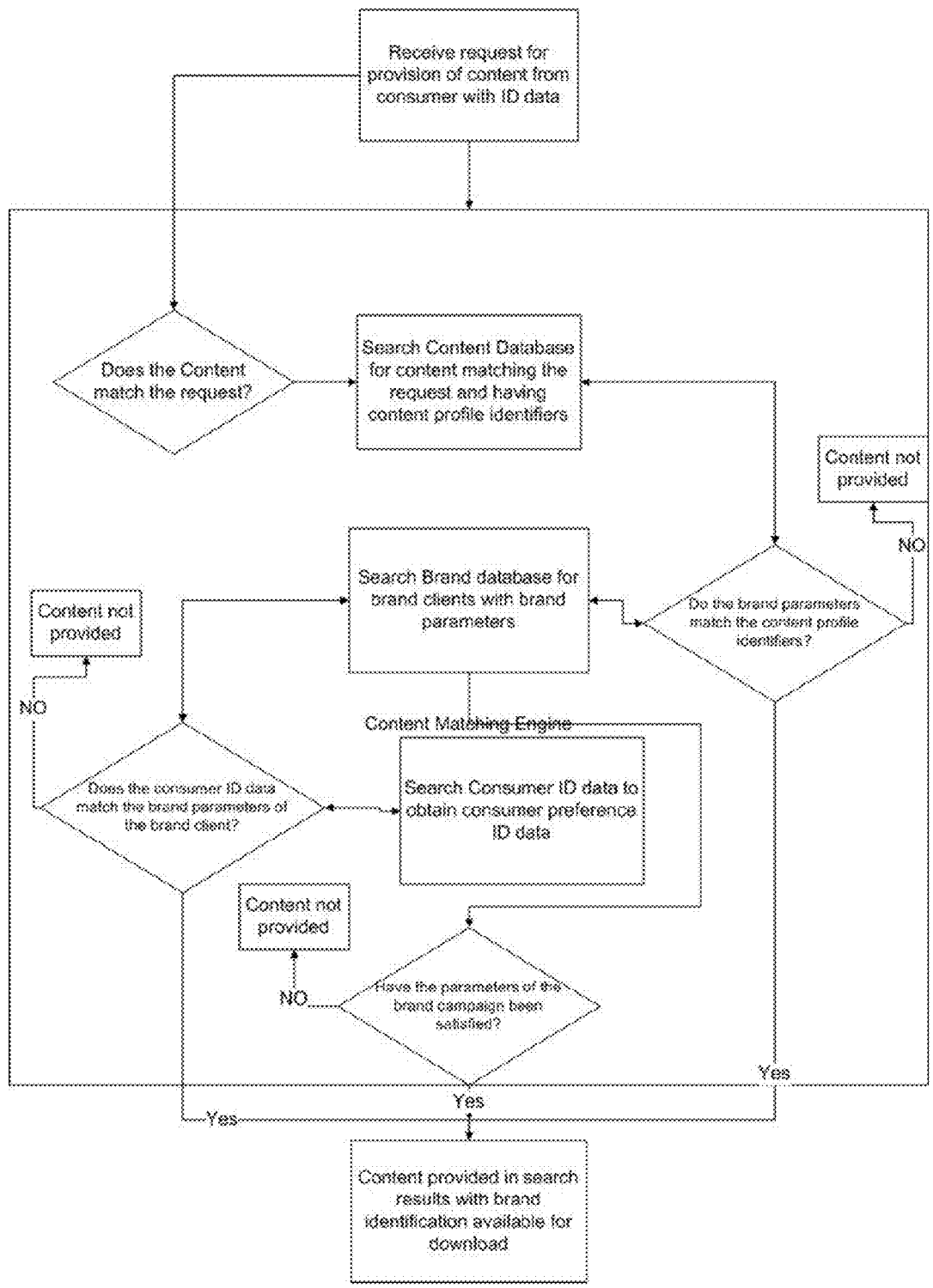
FIG. 9 is a flowchart of the algorithm of the content matching engine according to a preferred embodiment of the present invention with a brand campaign matching step.

The Consumer Interface, a preferred form of which is illustrated in FIG. 7, provides a mechanism by which consumers can become a registered user of the system, and thereby be eligible to download content.

Membership to the system for consumers is free in response to the consumer providing information by creating a consumer profile. Each consumer has a profile containing information of two basic types namely, generic identifying information such as name, address, contact details and also habit or preference data such as age, likes and dislikes, music choices, brand preferences and the like.

The preference data may be captured or provided by a consumer directly, that is, in answer to direct questions as to their preferences or through surveys, testing or quizzes, for example in order to build a consumer preference profile for each consumer.

As mentioned above, membership to the system for the consumers will typically be through the system administrator although this process may be automated and systems provided to approve membership of consumers based on the information provided.

Consumers have access to their consumer profile through the consumer interface. Access to the consumer database will be according to login or access information which will give a consumer access to his own profile. Normally, the consumers access the generic interface and access will be granted based on their login or identifying information with use of the system limited according to that information.

Consumers can amend their consumer data at any time which will normally upload to the consumer database.

The Consumer Interface will also preferably provide a mechanism by which a registered consumer can search for content. Searching facilities are provided which allow simple or advanced searches. Typically the searches will be performed in the light of a particular registered consumer's user profile and only return results that match both the users search parameters and their consumer profile data.

Normally, the results are returned as a short list which returns the matches to the search and identifies the matches by associating a brand with each match. For example, a search for a particular content piece may return five results for the content piece with each of the results associated with a different brand allowing the consumer to choose the content according with the associated brand.

The system may also allow generic searching that is searching not based on a particular registered users' profile. This will typically return results on any branded content.

The content matching engine provides a transactional model allowing content to be downloaded by a consumer provided that the content matches the consumer's search preferences via a confirmation trigger, and that the consumer fits within the brand client's preference parameters. The content matching engine will therefore check the consumer profile prior to releasing the content for download and compare the consumer profile with the branding parameters entered by the brand client. The content matching engine also tracks the content downloaded, and enables payment to content owners once download has been authorized.

There will therefore be a request by consumer in the form of a search, authorization of the download of the content provided that the consumer's profile matches the branding parameters of the brand client, and once the download is complete (or upon authorization of the download) the content matching engine will also authorize the payment of remuneration to the content owner.

For example a sample branding campaign developed by a brand client may appear as follows:

A spend of $500 to obtain 500 people in a postcode/region in a defined sex/age group and a simplified brand personality based on genre and mood.

The division of value raised by charging the brand client $1.00 per download according to the embodiment illustrated is therefore:

1. 4 cents per download to the Network provider 10;
b 2. media and creative agencies receive 8 c per download;
3. 4 cents per download to the system administrator and technology partners 11;
4. 80 cents per download to the content provider 12.

This ensures that the content provider earns income from the use of their content and the consumer still obtains free content.

In the present specification and claims, the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

As noted previously the forgoing descriptions of the specific embodiments are presented for purposes of illustration and description. They are not intended to be exhaustive or to limit the invention to the precise forms disclosed and obviously many modifications and variations are possible in view of the above teachings, including equivalents. The embodiments were chosen and described in order to explain the principles of the invention and its practical applications, to thereby enable those skilled in the art to best utilize the invention and various embodiments thereof as suited to the particular use contemplated.

The invention claimed is:

1. A computer implemented advertising system including
at least one consumer database electronically stored on a data storage device containing a plurality of consumer profiles with consumer preference identifying data,
at least one brand database electronically stored on a data storage device containing details of brand clients, each having one or more branding parameters,
at least one content database electronically stored on a data storage device containing a plurality of pieces of content provided by at least one content provider with each piece of content having one or more content profile identifiers,
a content matching engine operating on a network of computers with access to the at least one electronically stored consumer, brand and content databases and which matches the branding parameters of the brand clients with one or more of pieces of content and with one or more of the consumer preference identifying data and provides the one or more pieces of content to one or more consumers upon a consumer request, with corresponding advertising from at least one brand client identifying the brand client to the consumer, based on at least the matching at no cost to the consumer whilst charging an advertising fee to the brand client and paying a content provision fee to the content provider, the brand client charged the advertising fee each time the at least one consumer selects content associated with the brand client, a portion of the advertising fee is paid to the content provider as a license fee for the content;
wherein results of the matching are included on a results list presented to the at least one consumer in response to a search for content;
wherein the results list includes a matched piece of content, and the matched piece of content is identified on the results list as associated with two or more different brand clients;
wherein the content matching engine produces a results interface for presenting the results list to the at least one consumer;
wherein the results interface prompts the consumer to select a selected brand client from the two or more different brand clients in the results list; and
wherein the content matching engine provides to the consumer, based on a selection of the selected brand client received from the consumer, the matched piece of content that is identified as associated with the selected brand client;
a communications system associated with one or more communications pathways to receive inbound requests from consumers and distribute content in electronic form to the consumer in response to a request.

2. An advertising system as claimed in claim 1 for distributing physical media upon which entertainment content is stored, as well as content in electronic form remotely.

3. An advertising system as claimed in claim 1, wherein the communications system includes devices with computer processors and communication pathway connection components such as telephones, portable or desktop computers, personal data storage devices, MP3 and MP4 players, audiovisual storage and display devices, and televisions.

4. An advertising system as claimed in claim 1 wherein the system is accessed through a generic interface associated with a network of computers with access and corresponding rights and abilities within the system for a system administrator, consumers, brand clients and content providers differentiated by unique access or login information.

5. An advertising system as claimed in claim 4 wherein a content interface is provided through which the content provider is able to upload content which they wish to distribute through the system into the at least one content database, with access to the content interface through unique access or login information entered into a generic interface.

6. An advertising system as claimed in claim 4 wherein a brand interface is provided through which the brand client is able to define a campaign that targets consumers according to their geographic/demographic data and their brand preferences with access to the brand interface through unique access or login information entered into a generic interface.

7. An advertising system as claimed in claim 4 wherein a brand interface is provided through which the brand client is able to define the personality of a brand and associations with branded entertainment with access to the brand interface through unique access or login information entered into a generic interface.

8. An advertising system as claimed in claim 4 wherein a consumer interface is provided through which the consumer is able to search for content, with access to the consumer interface through unique access or login information entered into a generic interface, the consumer interface associated with a search engine to provide at least one matching or best fit result.

9. An advertising system as claimed in claim 8 wherein multiple results are provided in a short list which returns the matches to the search and identifies the matches by associating a brand with each match, even when the same piece of content is available through different brand clients.

10. An advertising system as claimed in claim 1 wherein the consumer preference identifying data for each user in the at least one consumer database is updatable by the consumer.

11. An advertising system as claimed in claim 1 wherein each consumer profile contains information of two basic types namely, generic identifying information and consumer preference identifying data.

12. An advertising system as claimed in claim 1 wherein the at least one brand database contains identifiers of a brand client and branding parameters which define the message which the brand client wishes to convey to their targeted demographic.

13. An advertising system as claimed in claim 1 wherein each piece of content is stored in an electronic file with one or more content profile identifiers.

14. An advertising system as claimed in claim 1 wherein each piece of content has one or more content profile identifiers to identify the profile of the content, and ownership information to identify who owns the content in order to recompense the content provider.

15. An advertising system as claimed in claim 1 wherein the content profile identifiers for a piece of content is adjustable through the monitoring electronic searches and/or results on the Internet.

16. An advertising system as claimed in claim 1 wherein application or adjustment of content profile identifiers occurs in real time.

17. An advertising system as claimed in claim 1 wherein each piece of content has one or more content profile identifiers applied to it upon the first provision of that piece of content to the system.

18. An advertising system as claimed in claim 1 including an analysis of each piece of content upon the first provision of that piece of content to the system in order to check to see whether a particular piece of content which has been submitted is already present on the system.

19. An advertising system as claimed in claim 1 wherein the one or more content profile identifiers for the piece of content are changed in response to feedback from consumers who have been provided with that piece of content.

20. An advertising system as claimed in claim 1 wherein each piece of content be provided with one or more content profile identifiers in different levels of importance with the number of tags in each level varying with the level of importance.

21. A computer implemented method of providing brand matched content to a consumer, the method including the steps of:
  i. creating and maintaining at least one consumer database electronically stored on a data storage device containing a plurality of customer profiles with consumer preference identifying data;
  ii. creating and maintaining at least one brand database electronically stored on a data storage device containing details of brand clients, each brand client having one or more associated branding parameters;
  iii. creating and maintaining at least one content database electronically stored on a data storage device containing a plurality of pieces of content provided by at least one content provider, with each piece of content having one or more content profile identifiers;
  iv. matching at least some of the branding parameters of the brand clients with one or more of pieces of content using a computer implemented algorithm operating on a computer processor, and
  providing the one or more pieces of content in electronic form to one or more consumers upon the consumer request, with corresponding advertising from at least one brand client identifying the brand client to the consumer, based on at least the matching of at least some of the branding parameters and the consumer preference identifying data, at no cost to the consumer whilst charging an advertising fee to the brand client and paying a content provision fee to the content provider, the brand client charged the advertising fee each time the at least one consumer selects content associated with the brand client, a portion of the advertising fee is paid to the content provider as a license fee for the content; and
    wherein results of the matching are included on a results list presented to the at least one consumer in response to a search for content;
    wherein the results list includes a matched piece of content, and the matched piece of content is identified on the results list as associated with two or more different brand clients;
    wherein the content matching engine produces a results interface for presenting the results list to the at least one consumer;
    wherein the results interface prompts the consumer to select a selected brand client from the two or more different brand clients in the results list; and
    wherein the content matching engine provides to the consumer, based on a selection of the selected brand client received from the consumer, the matched piece of content that is identified as associated with the selected brand client.

* * * * *